United States Patent [19]

Obrecht

[11] Patent Number: 4,512,596
[45] Date of Patent: Apr. 23, 1985

[54] ANTI-UNSCREWING DEVICES

[75] Inventor: Georges Obrecht, Le Canton, France

[73] Assignee: Alsthom-Atlantique, Paris, France

[21] Appl. No.: 486,583

[22] Filed: Apr. 19, 1983

[30] Foreign Application Priority Data

Apr. 19, 1982 [FR] France ................ 82 06644

[51] Int. Cl.³ ............................................ F16L 55/00
[52] U.S. Cl. ...................................... 285/81; 285/330;
285/DIG. 14
[58] Field of Search ................. 285/81, 330, DIG. 14,
285/401, 402

[56] References Cited

U.S. PATENT DOCUMENTS

| 579,643 | 3/1897 | Gleason | 285/330 |
| 1,170,779 | 2/1916 | Norling | 285/81 X |
| 2,176,504 | 10/1939 | McLaughin | 285/81 |
| 2,708,132 | 5/1955 | O'Neill | 285/81 X |

FOREIGN PATENT DOCUMENTS 678246  8/1979  U.S.S.R. ............................... 285/81

Primary Examiner—Richard J. Scanlan, Jr.
Attorney, Agent, or Firm—Sughrue, Mion, Zinn, Macpeak and Seas

[57] ABSTRACT

A device preventing the unscrewing of two bodies (2, 3), and in particular of two lengths of a turbodrill, joined end-to-end in threaded union, said device comprising a blocking part (4) which immobilizes the two bodies by means of teeth. The blocking part (4) is provided with two series of teeth, one of which series engages with the teeth of one body and the other with the teeth of the other body.

7 Claims, 8 Drawing Figures

FIG. 4
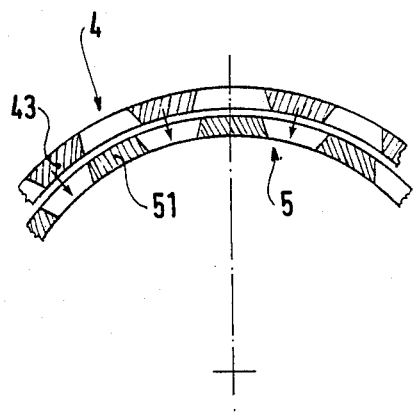
FIG. 5
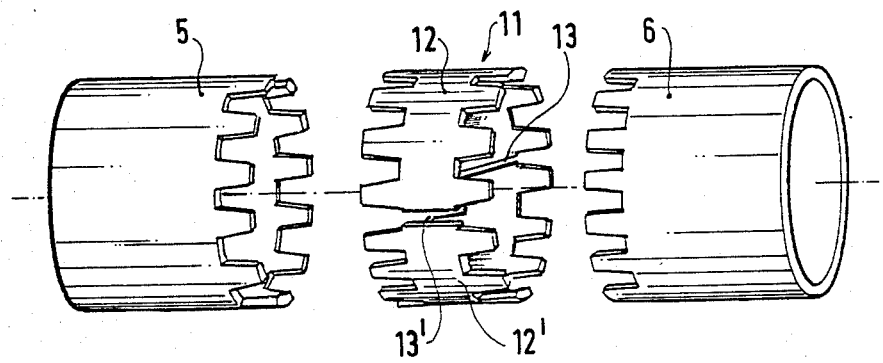
FIG. 6  FIG. 7  FIG. 8
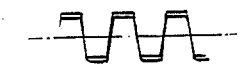 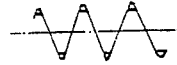 

ANTI-UNSCREWING DEVICES

This invention relates to a device preventing the unscrewing of two bodies joined in threaded union, having a blocking part which immobilizes the two bodies by means of teeth. Said device is mainly designed for drilling operations and specifically for coupling several members of a turbodrill.

Experience shows that it is sometimes necessary to add sections to a turbodrill to boost its power, and it is also sometimes necessary to replace a damaged section. The sections are mounted in the shop and screwed together at the drill site. Each pipe section comprises, in addition to its external tubing or case, a shaft supporting the impeller blades, which is itself coupled to the drive shaft of the adjoining section.

No device has yet been proposed to prevent the accidental unscrewing of turbodrill members while in service.

Experience however has shown that such a loosening or uncoupling can occur and can have damaging consequences regardless of the final torque applied in joining the sections.

It is thus advisable to provide a device effectively locking said adjoining members of a turbodrill.

However, the thinness of these members makes it difficult to use a locking device employing a positive obstruction, as such a device entails a reduction of the metal sections ensuring mechanical resistance of the drill pipe. Moreover, many of the known devices of this type are really effective only after the coupled bodies have come unscrewed to a signficant extent. Finally, it should not be overlooked that, depending on the torque applied in coupling the members or depending on the adjustments required for proper operation of the turbodrill, the "correct" angular position of one body in relation to the other may vary by 1/6 , of a turn in relation to the position planned when the bodies were manufactured. Yet this correct position is the one which must be maintained.

There is another prior art device which prevents the unscrewing of cylindrical lengths joined up end-to-end in threaded union, comprising:

two cylindrical rings respectively surrounding the two lengths and non-rotatable about them, the two facing edges whereof having regular angular series of teeth on their entire perimeters projecting axially into an axial interval provided between the two rings, and a cylindrical blocking sleeve occupying said axial interval and surrounding the two bodies, said sleeve having along the entire perimeter of each of its edges a regular angular series of axially projecting teeth meshing with the roots or recesses between the teeth of the adjoining ring such that the device prevents the rotation of one body relative to the other, with a minimal diametrical encumberance.

The device is further provided with means for installing and removing said blocking sleeve.

This prior art device is described in U.S. Pat. No. 2,176,504 (McLAUGHLIN). It's disadvantage is that it is complex and costly and does not provide for the coupling of turbodrill sections not designed for its use because it involves an added length.

An object of the present invention is to provide a low-cost device preventing the accidental loosening or unscrewing of the two bodies even when the latter are joined in a correct relative angular position which is not foreseeable at the time of manufacture, whereby no additional length is imparted to the drill members, and no excessive increase in diameter, while enabling quick and easy installation and removal.

Another object of this invention is to allow the putting out of operation of the device in the event of accidental stresses in service, for example while drilling, without the drilling bodies going out of service.

SUMMARY OF THE INVENTION

The device according to the invention for preventing the unscrewing of two elongated cylindrical bodies joined end-to-end in threaded union comprises:

two cylindrical rings respectively surrounding said two bodies and non-rotatable in relation to the latter, the two facing edges whereof having a regular angular series of teeth on their entire perimeters projecting axially into an axial interval provided between the two rings, and a cylindrical blocking sleeve occupying said axial interval and surrounding the two bodies, said sleeve havng along the entire perimeter of each of its edges a regular angular series of axially projecting teeth meshing with the recesses between the teeth of the adjoining ring such that the device prevents the rotation of one body relative to the other with a minimal diametrical encumberance.

Means are provided for installation and removal of said blocking sleeve.

The device according to the invention includes the following features:

the blocking sleeve is a resilient sleeve having a slit through its entire length, enabling it to be readily expanded and oriented prior to its installation in the interval between the rings, then installed in said interval without displacement of said rings, and further enabling it to be maintained as installed by resilient latching;

the number of teeth N of one ring and of the facing edge of the blocking sleeve is different from the number of teeth $N+X$ of the other ring and of the other edge of the blocking sleeve, facing said second ring, the difference X between these two numbers N and $N+X$ being small compared with the smallest N of the two, such that the fraction of a rotation $X/2N (N+X)$, representing the largest possible value for the residual difference in alignment between the meshing teeth and recesses of the respective sleeve edge and adjoining ring edge, shall also be small, said residual difference in alignment being that which remains after the sleeve has been oriented to reduce the difference in alignment as much as possible.

It appears that the device must provide for an angular clearance to be equal to the greatest possible residual difference in alignment or that it must make it possible to modify the relative angular position of the two bodies prior to the sleeve being installed by an amount not exceeding said greatest possible residual difference in alignment, or that the device must provide for a combination of the two possibilities just mentioned. Whichever solution is adopted, it would clearly be best to construct the device in such a manner as to make the above-mentioned greatest possible residual difference in alignment, i.e. the greatest residual difference in alignment susceptible of occurring when the device is in service, as small as possible.

A non-limiting example of a device according to the invention preventing the unscrewing of two bodies joined end-to-end in threaded union is described hereunder with reference to the several figures of the appended drawings, together with alternative embodiments according to the invention.

BRIEF DESCRIPTION OF THE DRAWINGS

FIG. 4 an enlarged cross section through two elements of FIG. 1.

FIG. 5 is a perspective view which shows an alternative construction for the sleeve of FIG. 2.

FIGS. 6, 7 and 8 are schematic drawings of various tooth shapes which may be used in the device according to the invention.

DESCRIPTION OF PREFERRED EMBODIMENTS

Figure 1:
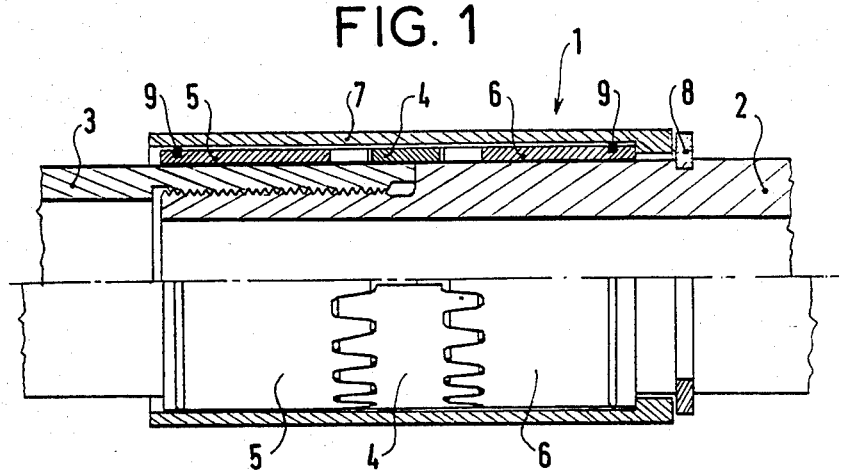
FIG. 1 is a partial sectional view which shows a device securing two bodies joined end-to-end in threaded union against unscrewing.

As is shown in FIG. 1, a body 2 is screwed home onto a body 3. A ring 5 is rigidly locked with body 2 by means of slottings or welds or other known means of attachment, the same occurring for ring 5 and body 3. The two rings are mounted and secured to the bodies during manufacture, at the plant. A slit blocking sleeve 4 is placed between the two teethed rings 5 and 6. An outside sleeve 7 protects the device against external damage, since the device is mainly utilized in abrasive environments. Tightness is provided by two O-rings 9. A lip on sleeve 7 and a snap ring 8 engaged in a slot in body 2 keeps the outside sleeve 7 in place.

Figure 2:
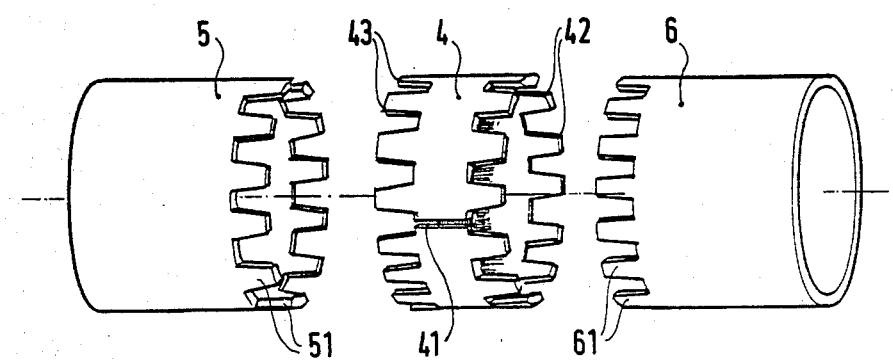
FIG. 2 is a perspective view of some of the elements of FIG. 1.

As shown in FIG. 2, the slit sleeve 4 is provided with a generatrix slit 41 at a point where a recess in tooth series 42 is exactly aligned with a recess in tooth series 43, for if the slit were made in the tooth itself, each resulting half-tooth would be extremely weak. The slit sleeve 4 has on each of its edges the same number of teeth as the number of teeth formed on the adjoining ring. Tooth series 42 of the blocking sleeve has the same number of teeth as tooth series 61 of ring 6 and tooth series 43 of the blocking sleeve has the same number of teeth as tooth series 51 of ring 5.

The blocking sleeve 4 is fabricated from sheet steel having sufficient resilience to enable the lips of slit 41 to be opened such that the inside diameter of said sleeve can be made greater than the outside diameter of ring 6. The interior diameter of said sleeve at rest is slightly less than that of bodies 2 and 3. The thickness of said sleeve is the same as that of rings 5 and 6. Said thickness is sufficient to ensure that the expected stresses tending to unscrew the bodies cannot distort the teeth of said sleeve and said rings and small enough to enable the lips of slit 41 to be easily opened as previously mentioned. These two conditions are substantially compatible due to the fact that the bases of the teeth are substantially wider than the sleeve is thick. Said thickness, furthermore, is also small enough so that, in the event of an exceedingly strong accidental unscrewing force, said teeth will be destroyed before damage can occur to bodies 2 and 3. The opening of the lips of the slit prior to installation is effected by means of a tool 4a similar to a screwdriver with a rounded tip, said tip being introduced between said lips and removed following final installation of the sleeve (see FIG. 3). The opening of the slit remaining once installed is enough to allow a tool to be inserted to reopen the lips.

Figure 3:
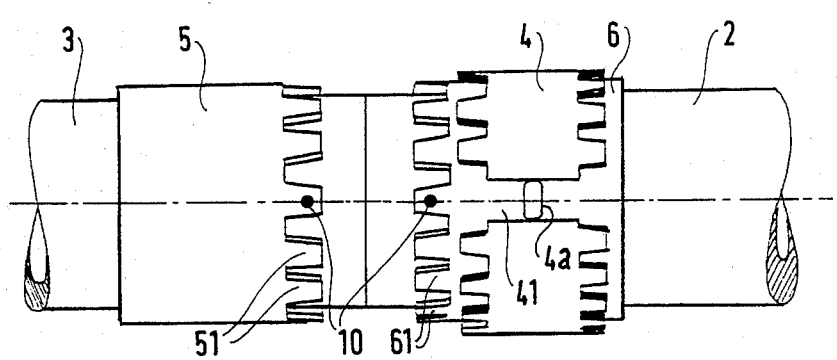
FIG. 3 is a side view which illustrates one of the steps in installing the device according to FIG. 1.

As shown in FIG. 3, the two bodies 2 and 3 are threadedly joined into abutment and tooth series 51 of ring 5 faces tooth series 61 of ring 6 in any chance position.

To install sleeve 4, which has been previously introduced either along body 2 or along body 3, requires finding the tooth of series 51 of ring 5 which is aligned with a tooth of series 61 of ring 6, at points 10. These two teeth shall be made to mesh with the two aligned recesses of slit 41 of sleeve 4, said sleeve having been previously positioned for the purpose.

Exact alignment of a tooth of series 51 of ring 5 with a tooth of series 61 of ring 6 involves an uncertainty equal to the half-difference between the spacings of the teeth. In fact, after tightening, the worst case would be one in which a recess in series 61 turned up exactly in front of a recess in series 51 such that it would be necessary to rotate one of the bodies one way or the other to obtain an alignment of two teeth. The device however does not require the operator to carry out such a substantial rotation of the parts, for the device itself, by design, and due to the play which it tolerates, will absorb the better part—and in some cases, all—of this uncertainty.

For example, if the number of teeth in series 51 is N and the number of teeth in series 61 is N+X, the value of the greatest possible residual difference in alignment would be:

$$e = \tfrac{1}{2}\left(\frac{\pi D}{N} - \frac{\pi D}{N + X}\right)$$

where D=average diameter of the sleeve and the rings.
To simplify:

$$e = \tfrac{1}{2}\left[\frac{\pi DX}{N(N + X)}\right]$$

such that $$\frac{e}{\pi D} = \tfrac{1}{2}\left[\frac{X}{N(N + X)}\right]$$

($e/\pi D$) is the maximum value in terms of fractions of a turn to be made so that a tooth of series 51 comes into aliggnment with a tooth of series 61.

This value will be minimal if numerator X equals the smallest possible number of teeth and if denominator N(N+X) is the greatest possible.

In this case, X is negligible compared with N, i.e. the difference (X) in the number of teeth (N, N+X) on each side of the sleeve is small compared with the numbers of teeth on each side. It may thus be stated that:

$$\frac{e}{\pi D} \simeq \frac{X}{2N^2}$$

Finally, the smallest possible value of X is 1, such that the series of teeth on one side of the slit sleeve would have one more tooth or one tooth less than the series of teeth on the other side of the sleeve. In this case:

$$\frac{e}{\pi D} \simeq \frac{1}{2N^2}$$

For example, if N=20;

$$\frac{e}{\pi D} \simeq \frac{1}{800}$$

of a rotation, It is this very small value which provides the advantage of the device according to the invention.

In FIG. 4, the flanks of teeth 51 of ring 5 and those of teeth 43 of ring 6 (the same applies to the other series of teeth) are realized in such manner as to provide teeth having an isosceles trapezoidal shape as seen in cross-section in a plane perpendicular to the axis of the bodies, the small base of the trapezoid being radially on the outside of the ring teeth and radially on the inside of the sleeve teeth. This feature facilitates the installation and removal of the slit sleeve. This arrangement can further constitute a torque limiting device as follows: when the torque tending to unscrew the bodies reaches a limit value, the flanks of the sleeve teeth will slide over the flanks of the ring teeth, causing the sleeve to open at the slit. In this way, destruction of the sleeve will be avoided. For this to occur, outside sleeve 7 should not be used.

FIG. 5 shows a sleeve 11 able to fulfill the same function as sleeve 4 of FIGS. 1, 2 and 3.

As shown in this figure, sleeve 11 comprises two flexible half-shells 12 and 12' separated by two slits 13, 13'. Slit 13' is identical to slit 41 of FIG. 2, and slit 13 is inclined so that it can extend between two roots or recesses between teeth. This shape of sleeve facilitates sleeve installation and, of course, sleeve removal.

FIGS. 6, 7 and 8 illustrate different shapes of teeth which might alternatively be used, i.e. trapezoidal, triangular and rounded teeth, respectively.

I claim:

1. A device preventing the unscrewing of two elongated cylindrical bodies joined end-to-end in threaded union, said device comprising cylindrical rings respectively surrounding the two bodies and means for mounting them non-rotatable thereabout (them), the two facing edges of said rings having regular angular series of teeth on their entire perimeters, projecting axially into an axial gap between the two rings, and a cylindrical blocking sleeve occupying said axial gap and surrounding the two aforementioned bodies, said sleeve having along the entire perimeter of each of its edges a regular angular series of axially projecting teeth meshing with the recesses between the teeth of the adjoining ring such that the device prevents the rotation of one body relative to the other, with a minimal diametrical encumberance, said device being provided with extenral means for installing and removing said blocking sleeve and wherein: said blocking sleeve comprises a resilient sleeve having a slit through its entire length enabling it to be radially expanded and oriented prior to its installation in the gap between the rings and installed in said gap without displacement of said rings and wherein it is maintained as installed by resilient latching; the number of teeth of one ring and of the facing edge of the blocking sleeve being different from the number of teeth N+X of the other ring and of the other edge of the blocking sleeve, facing said other ring, the difference X between the two numbers N and N+X being small compared with the smallest N of the two, thereby requiring only a small fraction of a rotation X/2N (N+X), to eliminate the residual difference in alignment between the meshing teeth and recesses of the respective sleeve edge and adjoining ring edge after the sleeve has been oriented and lock said sleeve in place.

2. A device according to claim 1 wherein the difference X between said two numbers of teeth N and N+X is one.

3. An anti-unscrewing device as in claim 1 wherein all the teeth of the rings and of the blocking sleeve are given a trapezoidal shape as seen in cross section through a transverse plane to facilitate the installation and removal of the blocking sleeve.

4. A device according to claim 1, wherein the blocking sleeve comprises two circumferentially spaced slits through the entire length thereof, at least one of said slits being inclined such that said at least one of said slits extends between two circumferentially offset recesses between teeth of opposite edges of the sleeve.

5. A device according to claim 1, wherein said two bodies being secured against unscrewing are two adjoining tubular members of a turbodrill.

6. A device according to claim 1, wherein the rings and the blocking sleeve are protected against a corrosive environment by a second, outside sleeve with sealing parts.

7. A device according to claim 1, further comprising an outside sleeve overlying said blocking sleeve and said rings and seals between said outside sleeve and said rings to protect said blocking sleeve and said rings against a corrosive environment.

* * * * *